United States Patent Office 3,000,688
Patented Sept. 19, 1961

3,000,688
PROCESS FOR VATTING OF VAT DYESTUFFS
Friedrich Schubert, Leverkusen, Dieter Goerrig, Lohmar, and Manfred Söll, Leverkusen, Germany; said Schubert and said Söll assignors to said Goerrig
No Drawing. Filed Jan. 21, 1958, Ser. No. 710,197
Claims priority, application Germany Feb. 2, 1957
6 Claims. (Cl. 8—34)

This invention relates to the vatting of vat dyestuffs.

It is known to convert vat dyestuffs by a reduction process to give leuco compounds which are water-soluble either per se or in the form of their salts. From the "vat" thus obtained the fibers may be dyed and the initial vat dyestuffs recovered by an oxidation process. Sodium dithionate is generally used as reducing agent for the vatting ($Na_2S_2O_4$).

It has now been found that the vatting can also be carried out with the aid of borohydrides in the presence of compounds of tetravalent sulfur.

The process according to the invention has the advantage that the vatting proceeds substantially more rapidly than with the reducing agents hitherto used. For example, when the vatting of "Indanthrene" Blue RSN (G. Schultz "Farbstofftabellen" vol. 1 (1931) No. 1228) is carried out in the presence of sodium dithionite, more than 10 minutes are required for the preparation of the simple blue vat at room temperature, and several hours for the preparation of the brown vat at 40° C. In contrast to that the blue or brown vat is obtained at room temperature in less than one minute by the method according to the invention.

Borohydrides suitable for the process according to the invention are, for example, the alkali metal borohydrides or alkaline earth metal borohydrides. Since the reduction proceeds with a high reaction rate, it is generally not necessary to employ a large excess of borohydride. As sulfur compound, those compounds are suitable which contain tetravalent sulfur or which enable tetravalent sulfur to be formed in the reaction conditions. Suitable compounds are, for example those which contain the grouping $HSO_3'$ or $SO_3''$, such as sodium bisulfite or sodium sulfite as well as compounds forming these ions by the action of water such as $SO_2$, the meta-bisulfites or the amino derivatives of sulfurous acid as well as compounds containing in addition to tetravalent sulfur also those of other valency such as e.g. the dithionates and dithionites. It is possible to use, moreover, the substitution products of sulfurous acid such as the sulfonic acids. Among sulfur compounds in which the sulfur is transformed under the reaction conditions into tetravalent sulfur, there may be mentioned the hyposulfites and sulfates. Especially suitable for the new process are the acid sulfites such as sodium bisulfite. In general, it is sufficient for the reduction to add the sulfur compounds in catalytic quantities.

It is advantageous to effect the reduction of the vat dyestuff, which is performed in an aqueous medium in a weakly acid or alkaline medium. In general, a pH value of >5 has been found to be advantageous. Since in many cases the subsequent dyeing of the materials with the leuco compound is carried out with advantage in strong alkaline range, it is expedient to add the required additional lye only after the reduction is finished. It is advantageous to add an excess of borohydrides and sulfur compound in order to impart to the vat the necessary stability against the action of atmospheric oxygen required for a dyeing process which may subsequently be carried out. The amount of borohydrides and sulfur compound used can thereby vary in a wide range, for example there can be used per 1 part by weight of the dyestuff 0.1 to 5 parts by weight of the mixture of the borohydrides and the sulfur compound. These amounts can be varied furthermore, if desired. The proportion of the borohydrides and the sulfur compound in the mixture of both compounds can be varied also in a wide range, for example there can be used per 1 part by weight of the borohydrides 0.25 to 12 parts by weight of the sulfur compound. There can be used also larger or smaller amounts of the sulfur compound, if desired.

The following examples are given for the purpose of illustrating the invention without, in any way, limiting it thereto.

Example 1

2 parts by weight of indigo powder are pasted with about 2 parts by volume of water and treated in about 20 parts by volume of water with 0.16 part by weight of potassium borohydrides and 1.8 parts by weight of sodium bisulfite. After five minutes, 4 parts by volume of a 30 percent sodium hydroxide solution are added and the solution is made up with cold water to about 1000 parts by volume. 50 grams of cotton yarn are dyed in conventional manner in this dyebath at 20–25° C. for 45 minutes.

Example 2

0.8 part by weight of "Indanthrene" Red RK (Color Index, 1st edition (1924) No. 1162) are treated in about 1000 parts by volume of water at 20–25° C. with 25 parts by weight of Glauber's salt, 0.2 part by weight of potassium borohydrides and 2.2 parts by weight of sodium bisulfite. After 3 minutes, 6 parts by volume of a sodium hydroxide solution (30 percent) are added and 50 parts by weight of pre-wetted cotton yarn are dyed in conventional manner in this dyebath at 20–25° C. for 45 minutes. The yarn is squeezed, aired for a few minutes, acidified, rinsed and boiled for 20 minutes with a soap solution containing per liter 2 grams of soap.

Example 3

0.8 part by weight of "Indanthrene" Orange 7RK (cf. G. Schultz "Farbstofftabellen," vol. 2 (1932) page 131) are treated in 100 parts by volume of water at 20–25° C. with 0.2 part by weight of potassium borohydrides and 2.2 parts by weight of sodium bisulfite for 3 minutes. The mixture is then made up with cold water to about 1000 parts by volume, 25 parts by weight of sodium sulfate and 6 parts of sodium hydroxide solution (30 percent) are added and 550 grams of cotton yarn are subsequently dyed at 20–25° C. for 45 minutes.

Example 4

0.8 part by weight of "Indanthrene" Blue 5G (cf. G. Schultz "Farbstofftabellen," vol. 1 (1931) No. 1238) are vatted in 1000 parts by volume of water with 0.28 part by weight of potassium borohydrides and 3.1 parts by weight of sodium bisulfite. The vat acid thus formed is dissolved in 15 parts by volume of a 30 percent sodium hydroxide solution. 50 grams of cotton yarn are turned in this dyebath at 50–60° C. for 45 minutes and after-treated as described above.

Example 5

0.8 part by weight of "Indanthrene" Red Brown GR (cf. G. Schultz, "Farbstofftabellen," suppl. vol. II, page 204) are vatted in 978 milliliters of water at 50–60° C. with 0.28 part by weight of potassium borohydrides and 3.1 parts by weight of sodium bisulfite. After the addition of 22 parts by volume of a sodium hydroxide solution (30%) 50 grams of pre-wetted cotton yarn are dyed in a conventional manner at 50–60° C. for 45 minutes and then after-treated.

Example 6

0.8 part by weight of "Indanthrene" Brilliant Blue 3G (cf. G. Schultz "Farbstofftabellen," suppl. vol. 1, page 105) are reduced in 1000 parts by volume of water with 0.23 part by weight of potassium borohydrides and 2.5 parts by weight of sodium bisulfite. Upon adding 8 parts by volume of sodium hydroxide solution (30%) to the suspension thus obtained, the vat acid formed dissolves with the formation of its sodium salt. After the addition of 15 parts by weight of sodium sulfate, 50 grams of a pre-wetted cellulose fabric are dyed at 45–50° C. for 45 minutes and after-treated in conventional manner.

Example 7

0.5 gram of thioindigo, 0.1 gram of potassium borohydrides, 0.4 gram of sodium sulfite and 0.6 gram of sodium bicarbonate are introduced into 200 milliliters of water. The dyebath thus obtained is heated to 55–60° C. and 10 grams of wool are dyed therein at the same temperature, turning the wool from time to time.

With nearly complete exhaustion of the bath, a dyeing is finally obtained which corresponds to a dyeing obtained with hydrosulfite in the ammoniacal pH range.

If, however, the sodium sulfite serving as catalyst is not used, with otherwise completely the same procedure a very weak dying of the goods is obtained and it is estimated that only 1 percent of the dyestuff quantity fixed in the presence of sodium sulfite, is exhausted.

Example 8

5 milligrams of "Indanthrene" Orange RRTS (cf. G. Schultz ("Farbstofftabellen," 7th edition, vol. 2, page 131), 5 milligrams of sodium borohydrides, 25 milligrams of ammonium chloride and 50 milligrams of the sodium salt of 2-chloro-ethane sulfonic acid are introduced into 15 milliliters of water. Upon treating the suspension thus obtained with 0.5 milliliter of sodium hydroxide solution (38° Bé.) a violet vat is immediately obtained.

If, however, the sodium salt of 2-chloro-ethane-sulfonic acid is not used, no vat is obtained upon the addition of sodium hydroxide solution even after one hour.

As further catalysts there may be used, for example, 50 milligrams of the sodium salt of 2-hydroxy-ethane-sulfonic acid or the sodium salt of ethyl-sulfinic acid.

Example 9

5 milligrams of "Indanthrene" Orange RRTS (cf. G. Schultz, "Farbstofftabellen," 7th edition, vol. II, page 131), 5 milligrams of potassium borohydrides and 2 milliliters of dimethyl-sulfoxide are introduced into a solution of 10 milliliters of water and 5 milliliters of sodium hydroxide solution. Upon heating the suspension thus obtained to 90° C. the dyestuff starts to vat and after 8 minutes the liquor shows a violet color.

A corresponding suspension without dimethyl-sulfoxide serving as catalyst, starts to vat only after 9 minutes and a violet coloring cannot be observed even after a prolonged period of time.

50 milligrams of butadiene sulfone or 100 milligrams of 4,4'-dihydroxy-diphenylsulfone or (3-amino-4-hydroxyphenyl)-ethylsulfone having a similar effect to that of dimethylsulfoxide.

Example 10

In a suspension containing per liter 1.25 grams of the sodium salt of methane sulfonic acid, 3.1 grams of potassium borohydrides, 9.4 grams of sodium carbonate and 20 grams of "Indanthrene" Brilliant Green FFB (cf. G. Schultz, "Farbstofftabellen," 7th edition, vol. II, page 128), several pieces of cotton fabric are immersed and evenly squeezed between 2 rollers so that the quantity of liquor remaining in the fabric amounts to approximately 85 percent of the weight of the fabric, and subsequently subjected to saturated steam under normal pressure. The individual fabric pieces are steamed for different periods of time. They are, subsequently oxidised in a 0.5 percent sodium perborate solution and boiled in a 0.5 percent soap solution for 20 minutes. By way of comparison, the same number of fabric pieces are soaked in a suspension which, but for the catalyst, has the same composition as the suspension described above, and further treated according to the above instructions. The following is then observed:

After a steaming period of 45 minutes, the dyestuff quantity fixed on the fabric piece treated with the catalyst-containing suspension is larger by 30 percent than the dyestuff quantity on the fabric piece treated with the suspension having no catalyst.

Instead of the above sodium salt of methane sulfonic acid there can be used as well 1 g. of the sodium salt of anthraquinone-2-sulfonic acid.

We claim:
1. In the process for the reduction of vat dyestuffs the improvement which comprises employing as the reducing agent a borohydride in the presence of a compound of tetravalent sulfur.
2. The process of claim 1 wherein the borohydride is an alkali metal borohydride.
3. The process of claim 2 wherein the compound of tetravalent sulfur is selected from the group consisting of alkali metal bisulphites, alkali metal sulfites, sulfonic acids, sulfoxides and sulfones.
4. The process of claim 3 wherein the compound of tetravalent sulfur is an alkali metal bisulfite.
5. The process of claim 3 wherein the compound of tetravalent sulfur is an alkali metal salt of methane sulfonic acid.
6. The process of claim 3 wherein the vat dyestuff is an Indanthrene vat dyestuff.

References Cited in the file of this patent
UNITED STATES PATENTS

| 2,304,502 | Hopkins et al. | Dec. 8, 1942 |
| 2,745,788 | Frohnsdorff et al. | May 15, 1956 |

OTHER REFERENCES

"The Application of Vat Dyes" by Jacoby et al., copyright 1953, page 20.

Gaylord, "Reduction With Complex Metal Hydrides," Interscience Publisher, Inc., New York, 1956, p. 312.

Jacoby et al., "The Application of Vat Dyes," Amer. Association of Textile Chemists and Colorists, 1953, pp. 222–224.

Fox, "Vat Dyestuffs and Vat Dyeing," John Wiley and Sons, Inc. New York, 1947, p. 37.